United States Patent
Di Stefano

(10) Patent No.: US 8,697,243 B2
(45) Date of Patent: *Apr. 15, 2014

(54) FILM-COATED GLAZING

(75) Inventor: Gaetan Di Stefano, Jumet (BE)

(73) Assignee: AGC Glass Europe, Brussels (BE)

( * ) Notice: Subject to any disclaimer, the term of this patent is extended or adjusted under 35 U.S.C. 154(b) by 542 days.

This patent is subject to a terminal disclaimer.

(21) Appl. No.: 12/933,602

(22) PCT Filed: Mar. 20, 2009

(86) PCT No.: PCT/EP2009/053288
§ 371 (c)(1),
(2), (4) Date: Sep. 20, 2010

(87) PCT Pub. No.: WO2009/115595
PCT Pub. Date: Sep. 24, 2009

(65) Prior Publication Data
US 2011/0027562 A1    Feb. 3, 2011

(30) Foreign Application Priority Data

Mar. 20, 2008 (EP) .................................. 08102808

(51) Int. Cl.
*C03C 17/36* (2006.01)
(52) U.S. Cl.
CPC ........... *C03C 17/3644* (2013.01); *C03C 17/366* (2013.01); *C03C 17/3681* (2013.01); *C03C 17/3613* (2013.01)
USPC ....................................................... 428/432
(58) Field of Classification Search
None
See application file for complete search history.

(56) References Cited

U.S. PATENT DOCUMENTS

| | | | |
|---|---|---|---|
| 5,514,485 A | 5/1996 | Ando et al. | |
| 6,306,525 B1 | 10/2001 | Schicht et al. | |
| 2004/0009356 A1 | 1/2004 | Medwick et al. | |
| 2004/0053068 A1* | 3/2004 | Schicht et al. | 428/627 |
| 2004/0241490 A1 | 12/2004 | Finley | |
| 2006/0099427 A1 | 5/2006 | Schicht et al. | |
| 2006/0139783 A1* | 6/2006 | Decroupet | 359/883 |
| 2007/0116967 A1 | 5/2007 | Medwick et al. | |
| 2007/0218311 A1* | 9/2007 | O'Shaughnessy et al. | 428/621 |
| 2007/0231501 A1* | 10/2007 | Finley | 427/531 |

FOREIGN PATENT DOCUMENTS

| | | |
|---|---|---|
| EP | 0 922 681 | 6/1999 |
| WO | 02 42234 | 5/2002 |
| WO | 03 093188 | 11/2003 |
| WO | 2004 013059 | 2/2004 |
| WO | WO2006/048462 * | 5/2006 |

OTHER PUBLICATIONS

O'Bannon, Dictionary of Ceramic Science and Engineering, 1984, pp. 230 and 258.*
U.S. Appl. No. 12/933,542, filed Sep. 20, 2010, Di Stefano.
U.S. Appl. No. 12/933,511, filed Sep. 20, 2010, Di Stefano.

* cited by examiner

*Primary Examiner* — David Sample
(74) *Attorney, Agent, or Firm* — Oblon, Spivak, McClelland, Maier & Neustadt, L.L.P.

(57) ABSTRACT

The present invention relates to essentially transparent glazings comprising a system of films deposited under vacuum by magnetron, and having antisun and/or low-emission properties, comprising as protective surface layer a layer based on titanium oxide and on at least one other metal oxide of high hardness from the group comprising: $ZrO_2$, $SiO_2$, $Cr_2O_3$.

21 Claims, 2 Drawing Sheets

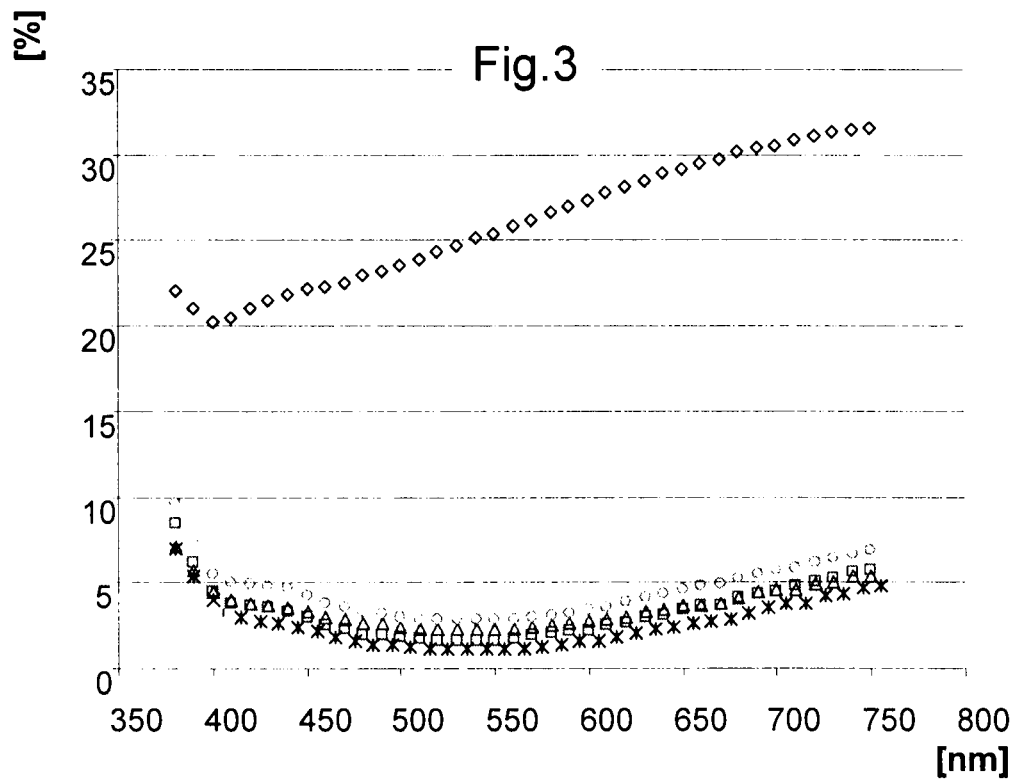
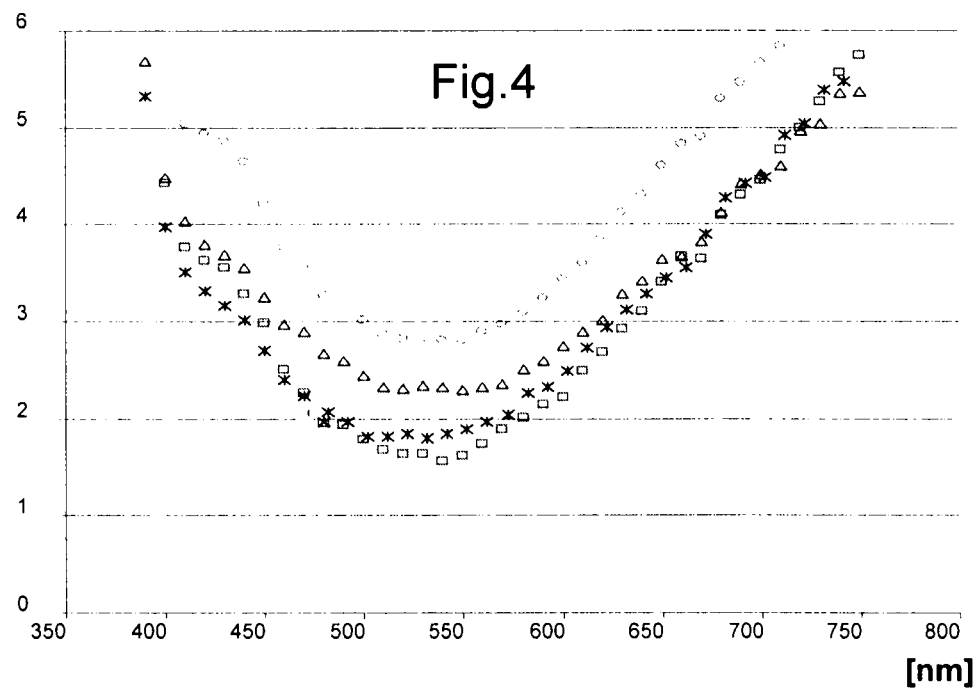

FILM-COATED GLAZING

The present invention relates to glazings comprising a set of films that impart antisun or low-emission properties.

The commonest coatings for the glazings in question are made via magnetron-assisted vacuum deposition techniques, known as "magnetron sputtering".

Layer systems deposited by these means make it possible to achieve noteworthy performance, both in terms of the thermal characteristics and in terms of the optical aspects. They may especially have very high selectivity, in other words they may constitute powerful filters for infrared rays, while at the same time allowing visible wavelengths to pass through. Under the best conditions, they may offer perfect reflection neutrality, especially avoiding undesired colourations.

Beyond the desired qualities, the glazings in question must also show sufficient resistance to the various attacking factors to which they may be exposed. These are especially chemical attacking factors: air, water, saline fogs, etc., but also mechanical attacking factors to which they are subjected in the course of transportation or transformation during their use.

Glazings having these antisun and/or low-emission properties invariably comprise a set of "functional" layers that reflect infrared, and of dielectric layers that protect the first layers and minimize the reflection of the visible wavelengths.

Among the protective layers, the outermost must especially give these systems the chemical resistance and mechanical strength properties mentioned earlier, whilst, obviously, not impairing the other properties. As a guide, layers that are nevertheless renowned for their mechanical strength, especially certain oxides proposed previously, may be difficult to produce, for instance $SiO_2$. For its part, $SnO_2$ does not show excellent resistance. Nitrides, which are another possibility for these surface layers, require deposition under a nitrogen atmosphere, which limits the possibilities of use. Other layers do not afford satisfactory light transmission.

The invention proposes surface layers for these antisun and/or low-emission systems, which offer an improved set of properties when compared with those of prior art systems.

The invention proposes to provide as a surface layer a layer based on titanium oxide and on at least one other metal oxide of high hardness, from the group comprising: $ZrO_2$, $SiO_2$, $Cr_2O_3$.

The respective proportions of titanium oxide and of the other metals may cover a wide range. In order for the effect to be noticeable, the additional oxide(s) must represent at least 5% by weight and preferably at least 10% by weight of the whole.

In the mixed oxide, the titanium oxide is present to a proportion of at least 40% by weight and preferably at least 50% by weight.

In a particularly preferred manner, titanium oxide represents at least 55% by weight.

In the mixed oxides used according to the invention, in addition to titanium oxide, zirconium oxide is particularly preferred on account of its very high hardness. It is advantageously present in a proportion of 15% to 50% by weight of the surface layer.

Besides the oxides of titanium and of the metals listed above, the surface layer according to the invention may also contain additional oxides that are practically indissociable from the preceding oxides. This is particularly the case for lanthanides, for instance yttrium oxide or hafnium oxide. When these additional oxides are present, their content remains relatively limited and does not exceed 8% by weight of the whole, and usually remains below 5%.

To play its role satisfactorily, the protective surface layer must have a certain thickness. However, if this layer is provided only for the mechanical properties it gives the layer system, a relatively modest thickness may suffice. Preferably, the thickness of this layer is not less than 3 nm.

Given that the oxides included in the composition of this surface layer are transparent, it is possible to use much thicker layers than would be necessary to improve the resistance. It is especially possible to use this protective layer as a component of the interference filter, in other words as a layer that significantly participates in maintaining high visible transmission and in establishing good reflection neutrality.

The surface layer used as component of the interference filter is advantageously combined with other dielectric layers. The choice of the assembly then takes into account not only the optical or structural properties of the various layers (index, transparency, crystal structure, interface quality), but also the relative ease of formation of these layers.

Whatever the structure considered, in practice the surface layer according to the invention remains at a thickness of not more than 35 nm.

The surface layers according to the invention that especially impart very good mechanical properties are also advantageously combined with layers that offer great resistance to chemical agents. Layers of this type are especially layers of tin oxide or layers of silicon nitride or silicon oxynitride. Silicon cathodes may contain aluminium as dopant in a small amount of about 4%, which are also found in the layer. These layers are immediately underneath the surface layer based on titanium oxide, and have a thickness that may also be relatively modest, of the order of a few manometers. These layers and especially that of tin oxide may also, when their thickness is substantially larger, play a significant optical role in the constituted interference system.

The coated glazings according to the invention advantageously have a scratch resistance according to the method forming the subject of standard ASTM 2486D, which is not greater than 30% and preferably not greater than 20% on a scale ranging from 0 to 100%, 100% corresponding to an entirely scratched glazing.

The coated glazings according to the invention also offer very good resistance in humidity tests. When subjected to the "Cleveland" test according to standard ISO 6270, for 3 days, the level reached is advantageously at least 3 on a scale ranging from 1 to 5, 5 corresponding to perfectly defect-free glazing. For the samples subjected to the saline spray test according to standard EN 1096, the result is advantageously greater than 3 after 2 days of exposure.

The invention is described in detail in the following examples, which are also the subject of the attached figures in which:

FIG. 3 is a graph representing the light absorption as a function of the wavelength for oxide monolayers used according to the invention;

FIG. 4 is analogous to the preceding figure, at a more detailed scale.

Figure 1:
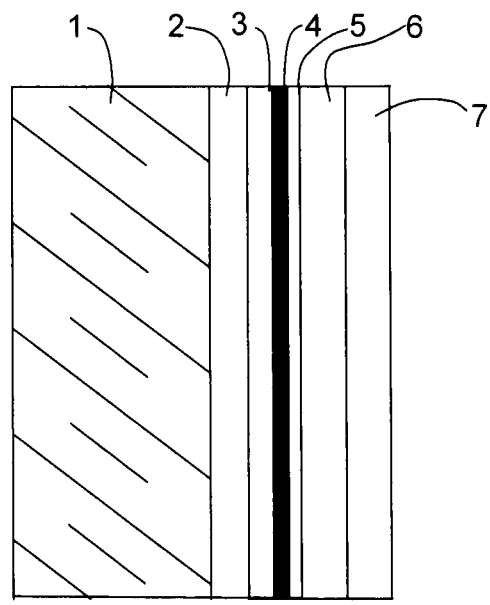
FIG. 1 is a schematic representation of a cross section of a glazing coated with a layer system according to the invention.

The glazing of FIG. 1 is shown in cross section without respecting the proportions of the various components, for the sake of clarity. The pane of glass 1 is coated with a set of layers comprising an infrared-reflecting silver-based layer 4. This silver layer is arranged between two sets of dielectric layers that protect it and give it good light transmission with good reflection neutrality.

The silver layer 4 is advantageously deposited on a layer 3 based on zinc oxide. Zinc oxide layers and layers based on doped zinc oxide are known for promoting the formation of a good interface with silver layers, especially without any roughness. They improve as a whole the properties of the latter layers. For the same amount of silver per unit area, the conduction, and hence the emissivity of the layers, are improved when they are deposited in this way. It may be a case of a low thickness of zinc oxide alone, the thickness of which is not greater than 15 nm.

When the thickness of zinc oxide is larger, there is a risk of developing columnar growth, which leads to a less uniform interface with increased roughness. To avoid this type of growth, it is known practice to dope the zinc oxide with other oxides, especially tin oxide.

The layers formed from zinc tin mixed oxide are conventionally of two types. The layers on which the silver layers are deposited advantageously have a low content of tin oxide, especially of about 10% by weight. As indicated previously, these layers are relatively thin and do not exceed 15 nm. The second type of zinc and tin mixed oxide layer is used to constitute in dielectric assemblies the main part of the optical path for dereflective effects. In this function, the layer(s) in question ordinarily have thicknesses of several tens of manometers. Typically, layers of this type are formed from a mixed oxide containing about 50% by weight of each of the zinc and tin oxides.

In the example shown in FIG. 1, a protective layer 5 is deposited on the silver layer 4. This is a conventional layer whose purpose is to protect the silver layer against impairments that might affect it during the subsequent depositions, especially when these depositions are performed in a reactive mode, for example under an oxidative atmosphere. The layer 5 is referred to as a "barrier" or "sacrificial" layer when it intervenes by reacting with the atmosphere, which, in the absence of this layer, would be liable to react with the silver layer.

These sacrificial layers are of very low thicknesses. They are not more than 6 nm and their thickness is preferably 2 or 3 nm. They are conventionally based on oxides, especially of titanium or of a material containing NiCr, or of Zr, and of the corresponding suboxides. Since they are deposited to be able to react while protecting the silver, they are often formed from targets of the corresponding metals, and oxidized in the following constitution of the stack. For this reason, the layers are often sub-stoichiometric. It is also possible to deposit them using ceramic targets that are themselves sub-stoichiometric. This way of proceeding makes it possible more conveniently to achieve in the final layer good oxidation in the region of the stoichiometry. In this manner, the extinction coefficient of the layer is optimally reduced.

In FIG. 1, layers 2 and 6 are layers included in the constitution of the filter. They make it possible to prevent reflection of the majority of the rays in the visible region. By virtue of these layers, the colour of the transmitted light and above all of the reflected light is also controlled, it being known that, in the vast majority of applications, every effort is made for the latter to ensure that this light is as weak and as neutral as possible.

The conventional dielectric layers are mainly formed from oxides of: Zn, Sn, Ti, Al, Zr, Nb. Their thickness depends on their index and on the required optical paths, which are themselves dependent on the thickness of the infrared-reflecting layer. The relationships between these magnitudes are perfectly established and usually give rise to determinations by means of specialized programs. Starting from the values thus determined, the subsequent adjustments are made to take into account the differences that may exist between the effective structure, composition or configuration characteristics and the corresponding characteristics of the ideal layers.

The surface layer 7 is a layer according to the invention based on titanium oxide comprising an oxide of high hardness ($ZrO_2$, $SiO_2$, $Cr_2O_3$,).

By way of example of a stack of this type in accordance with the invention, the following examples are prepared. The thicknesses are expressed in Ångströms:

|  | TiZrOx | $ZSO_9$ | Ag | TiOx | $ZSO_9$ | TiZrOx |
|---|---|---|---|---|---|---|
| Ex. 1 | 180 | 60 | 120 | 20 | 210 | 160 |
| Ex. 2 | 180 | 60 | 120 | 30 | 210 | 160 |

In this table:
$ZSO_9$ denotes a layer of zinc oxide doped with 10% by weight of tin oxide;
TiOx is an under-oxidized titanium oxide (optionally, TiOx may be replaced with ZrOx, which is an under-oxidized zirconium oxide);
TiZrOx is a mixed titanium oxide comprising, on a weight basis, 50% of $TiO_2$, 46% of $ZrO_2$, the remainder being formed from elements usually accompanying zirconium, especially the oxide $Y_2O_3$; it is obtained from ceramic targets and deposited under a slightly oxidative atmosphere; the layer obtained is virtually stoichiometric.

The comparative example, analogous to the preceding examples but not comprising a surface layer according to the invention, is as follows:

|  | $TiO_2$ | ZnO | Ag | TiOx | ZnO | $SnO_2$ |
|---|---|---|---|---|---|---|
| Comp. Ex. 1 | 200 | 60 | 125 | 30 | 250 | 200 |

$TiO_2$ is a layer deposited under conditions that promote the formation of a virtually stoichiometric compound, as opposed to the $TiO_x$ barrier layers, which, on account of their function, are deposited maintaining a certain sub-stoichiometry that attenuates or disappears in the course of deposition of the subsequent layers.

All these examples correspond to low-emissivity systems of "non-toughenable" glazings. When subjected to a vigorous heat treatment of the bending/toughening type, their optical qualities are liable to be significantly modified.

The samples are tested for their capacity to withstand mechanical stresses. Under the conditions of the test, it is unimportant that differences are revealed in the constitution of the underlying layers. The results depend essentially on the quality of the surface layer.

The samples are subjected to a dry brush test according to standard ASTM 2486D. The degree of scratching is measured. The smaller this degree, the better the mechanical strength. The sample comprising the $SnO_2$ surface layer has a degree of scratching of 40%. Samples 1 and 2 according to the invention have, respectively, degrees of 5% and 15%. Their resistance is thus very significantly improved.

Similar tests are performed on systems made up in the following manner (thicknesses in Ångströms):

|  | $TiO_2$ | ZnO | Ag | TiOx | ZnO | $SnO_2$ | TiZrOx |
|---|---|---|---|---|---|---|---|
| Comp. Ex. A | 200 | 50 | 120 | 30 | 200 | 250 |  |
| Ex. B | 200 | 50 | 120 | 30 | 200 | 250 | 31 |
| Ex. C | 200 | 50 | 120 | 30 | 200 | 250 | 63 |

For these samples, the optical properties in the CIELAB system and the resistance are established in the following manner:

| | Light transmission | | | |
|---|---|---|---|---|
| | Y(D65.2°) | L*(D65.10°) | a*(D65.10°) | b*(D65.10°) |
| Comp. Ex. A | 86.14 | 94.27 | −1.81 | 3.88 |
| Ex. B | 86.87 | 94.6 | −2.03 | 3.39 |
| Ex. C | 86.19 | 94.3 | −1.85 | 3.49 |

|  | Light reflection | | | |
| --- | --- | --- | --- | --- |
|  | Y(D65.2°) | L*(D65.10°) | a*(D65.10°) | b*(D65.10°) |
| Comp. Ex. A | 27.8 | 0.15 | −10.44 | 19.68 |
| Ex. B | 27.8 | 0.3 | −8.44 | 4.89 |
| Ex. C | 28.38 | 0 | −9.65 | 5.46 |

The respective resistances per square of these three samples are 3.65, 3.44 and 3.51 Ω/□.

The optical and resistance qualities are not substantially modified by the presence of the protective layer according to the invention. The abrasion resistance measured according to standard ASTM 4086D is proportionately greater the thicker the protective layer. This is likewise the case for the measurement of the peel strength in the "wet rub test".

The "wet rub test" is intended to evaluate the resistance of the layer system to peeling by rubbing. The sample is subjected to rubbing with a piece of cotton fabric kept wet (demineralized water) under a load. The to-and-fro rubbing is performed at a frequency of 60 oscillations per minute. The movement is maintained usually for 500 cycles.

The change in the upper layer and the possible removal of this layer by this rubbing are observed.

The resistance in the "chemical" tests also shows an improvement as a function of the thickness of the protective layer. Three types of test are performed: the Cleveland test, the climatic chamber and the saline fog. The nature of these tests is detailed later with regard to the tests performed on samples comprising two silver layers. The sample with the thickest protective layer once again shows the best resistance to these three tests. The respective values are thus 4.5 for the Cleveland test, 4.5 for the climatic chamber and 3.5 for the saline fog.

Other tests are performed with layer systems comprising two silver layers. Again, comparative tests are performed. The comparative samples comprise a surface layer of tin oxide. The samples according to the invention are coated with a layer of titanium zirconium mixed oxide as previously.

In a first comparison, the structures are as follows (as previously, the thicknesses are expressed in Angströms):

The first test concerns the resistance to condensation according to the Cleveland method that is the subject of standard ISO 6270. According to this test, the samples are maintained under an atmosphere saturated with moisture at a constant temperature for several days. The possible appearance of defects and their density are noted. The test is considered as successful when the level reached after 1 day is 4 on a scale ranging from 1 to 5, the note 5 corresponding to a defect-free sample.

A test is also performed in a climatic chamber. This is also a test of resistance to condensation. In this test, the temperature passes from 45 to 55° C. alternatively each time for 1 hour. The atmosphere is also saturated with moisture. As previously, the result is good when the level after 3 days is at least 3 on the scale from 1 to 5.

The saline spray test is performed according to standard EN 1096. The sample in this case is satisfactory when the level is at least 2.5 after 2 days, still on the scale from 1 to 5.

The UV stability is determined by accelerated exposure. The level is satisfactory if it is at least 3.

The results obtained are reported in the following table:

|  | Cleveland 3 d. | Clim. ch. 3 d. | Spray 2 d. | UV |
| --- | --- | --- | --- | --- |
| Comp. Ex. 4 | 2.5 | 3 | 4 | 1 |
| Example 5 | 4 | 4.5 | 3.75 | 3 |
| Comp. Ex. 5 | 1.5 | 3.5 | 4 | 3.25 |
| Example 6 | 3.75 | 3.5 | 4 | 3.75 |

Relative to the reference samples, the structures according to the invention behave at least as well, and are particularly resistant in the moisture resistance tests.

Other tests are performed with surface layers based on a mixed oxide of titanium and silicon (TiSiO). The content of silicon oxide is 8% by weight. The deposition of these layers is performed either in a neutral gas (Ar) or in a mixture of neutral gas and of oxygen comprising 7% oxygen. These structures are again tested at different thicknesses for the surface layer (30, 80 and 130 Å).

The structure of the layer systems is analogous to that of the preceding examples 1 and 2.

|  | Layer | | | | | | | | | |
| --- | --- | --- | --- | --- | --- | --- | --- | --- | --- | --- |
|  | 9 | 3 | 4 | 5 | 10 | 11 | 4' | 12 | 13 | 7 |
| Comp. Ex. 2 | TiO$_2$ | ZnO | Ag | TiO$x$ | TiO$_2$ | ZnO | Ag | TiZrO$x$ | ZnO—Al | SnO$_2$ |
|  | 230 | 60 | 95 | 30 | 610 | 60 | 135 | 30 | 120 | 180 |
| Ex. 3 | TiO$_2$ | ZnO | Ag | TiO$x$ | TiO$_2$ | ZnO | Ag | TiZrO$x$ | ZnO—Al | TiZrO$x$ |
|  | 230 | 60 | 95 | 30 | 610 | 60 | 135 | 30 | 90 | 150 |
| Comp. Ex. 3 | TiZrO$x$ | ZnO—Al | Ag | TiO$x$ | TiO$_2$ | ZnO—Al | Ag | TiO$x$ | ZnO | SnO$_2$ |
|  | 230 | 60 | 95 | 30 | 610 | 30 | 135 | 30 | 100 | 160 |
| Ex. 6 | TiZrO$x$ | ZnO—Al | Ag | TiO$x$ | TiO$_2$ | ZnO—Al | Ag | TiO$x$ | ZnO—Al | TiZrO$x$ |
|  | 230 | 60 | 95 | 30 | 610 | 30 | 135 | 30 | 100 | 160 |

In this table, the abbreviations have the same meanings as previously. In addition, ZnO—Al denotes an aluminium-doped zinc oxide, comprising 5% by weight of aluminium.

Figure 2:
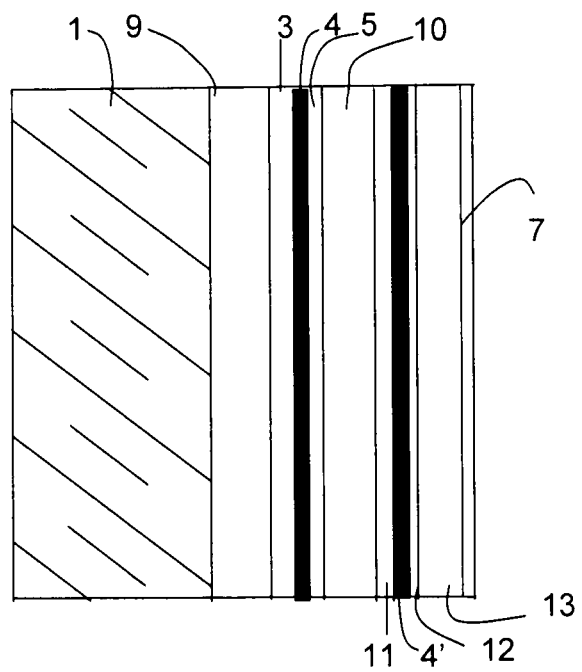
FIG. 2 illustrates another layer system comprising two silver layers.

The structure is that represented schematically in FIG. 2, whether it concerns the comparative samples or those of the invention.

The preceding samples were subjected to a series of resistance tests.

| TiO$_2$ | ZSO$_9$ | Ag | TiO$x$ | ZSO$_9$ | TiSiO |
| --- | --- | --- | --- | --- | --- |
| 180 | 60 | 120 | 20 | 210 | |

The following combinations are prepared and the properties indicated for the dry-brush scratch resistance and the "Cleveland" chemical test.

All the "Cleveland" tests show very good resistance of the samples according to the invention. The grades are all 4 or more on the scale from 1 to 5. The brush resistance gives the following results as a percentage of scratches:

|  | $O_2\%$ | Thickness Å | Resistance |
|---|---|---|---|
| TiSiO (8% Si) | 0 | 30 |  |
|  |  | 80 | 90 |
|  |  | 130 | 90 |
|  | 7 | 30 | 30 |
|  |  | 80 | 20 |
|  |  | 130 | 10 |

The abrasion resistance values show a manifest progression for the layers deposited under an atmosphere containing oxygen. This scratch resistance also depends, to a lesser extent, on the thickness of the layer.

The layers used according to the invention as protective surface layer also have the advantage over other types of layers presenting mechanical strength qualities, for instance titanium nitride, being very transparent at visible wavelengths. This transparency is proportionately better the more complete the oxidation of the layer. FIGS. 3 and 4 illustrate this feature.

On these figures, a series of absorption measurements are reported as a function of the wavelength. The measurements are taken on monolayers of titanium zirconium mixed oxide of the same type as those forming the subject of the preceding examples. The layers are deposited on a pane of clear glass 4 mm thick.

The layer of TiZrOx is uniformly 16 nm. It is deposited under an argon atmosphere whose oxygen content is variable, at a constant total pressure of 0.8 Pa.

The depositions are performed using a ceramic target comprising the titanium zirconium oxide mixture. The oxygen flow rate is successively zero (diamond), then 1 (circle), 2.5 (triangle) and 5 cm$^3$ (square) per kW of power applied at the cathode. The fifth measurement (star) corresponds to the final sample (5 cm$^3$) that has been subjected to the heat treatment of 600° C. for 3 minutes.

Under the atmosphere of argon alone, the absorption of the layer, FIG. 3, is very large. This absorption corresponds to the existence of sub-stoichiometry inherent to formation in this type of atmosphere. As soon as a small amount of oxygen is introduced, the ability of the titanium to react rapidly leads to radically different behaviour. The absorption is substantially reduced. The oxide mixture tends towards stoichiometry.

In FIG. 3, the various curves are very close together. To distinguish the effects of the oxygen content, the results are reported on another scale in FIG. 4. It is seen in this figure that the absorption is lower overall when the oxygen content is increased. However, a limit is rapidly reached. The curve that is presented for the sample that has undergone a heat treatment is virtually identical to that for the sample before this treatment. The layer is thus virtually stoichiometric for these concentrations.

The protective surface layers according to the invention are advantageously used to protect low-emission systems comprising one, two or three silver layers, each silver layer having a thickness of between 7 and 20 nm. The systems also comprise dielectric layers, especially based on zinc oxide, tin oxide and alloys thereof. These systems also comprise barrier layers located above the silver layers and formed from titanium or NiCr, Zr and oxides or suboxides thereof.

Glazings according to the invention that are useful as low-emission glazings especially comprise the following structure starting from the pane of glass:
ZnSnO(50/50)/ZnSnO(90/10)/Ag/TiOx/ZnSnO(90/10)/ZnSnO(50/50)/Ti ZrOx(55/45)

In this structure, the silver-based layer has a thickness of between 10 and 14 nm, the dielectrics located below the silver layer have thicknesses, respectively, of 20 to 35 nm and 6 to 10 nm, and for the dielectrics layers based on zinc oxide located above the silver, the respective thicknesses are 15 to 25 nm and 15 to 25 nm, the thickness of the TiZrOx surface layer being between 5 and 8 nm.

An analogous layer system is proposed according to the invention, which this time comprises two silver-based reflective layers. The structure of this system is, starting from the glass substrate:
ZnSnO(50/50)/ZnSnO(90/10)/Ag/TiOx/ZnSnO(50/50)/ZnSnO(90/10)/Ag/TiOx/ZnSnO(90/10)/ZnSnO(50/50)/TiZrOx(55/45)
with, for each set of dielectric layers, thicknesses such as under the first silver layer 20 to 35 nm and 6 to 10 nm, between the silver layers for the layers based on zinc oxide, 8 to 20 nm, 40 to 70 nm and 8 to 20 nm, respectively, and for the layer above the second silver layer 6 to 10 nm and 20 to 35 nm, the silver layers each having a thickness of between 10 and 14 nm, and the thickness of the TiZrOx surface layer being between 5 and 8 nm.

On the basis of this structure, an assembly comprising the protective upper layer according to the invention is compared with an analogous structure without this layer. The respective thicknesses of the various layers are:

Comparative Example

268/110/118/21/685/160/166/23/140/107/105
According to the Invention
218/160/118/21/685/160/166/23/120/77/105/31
The samples are subjected to the following tests:

|  | Brush | Cleveland | Clim. ch. 3 d. | Spray 2 d. | UV |
|---|---|---|---|---|---|
| Comparative | 75% | 2 | 3 | 4 | 4.5 |
| Invention | 1% | 4 | 4.5 | 4 | 4.5 |

The structure according to the invention shows very good resistance to abrasion and to the tests under humid conditions.

The invention claimed is:
1. An essentially transparent glazing comprising:
   a system of films deposited under vacuum by magnetron and having antisun and/or low-emission properties, said system of films comprising,
   a dielectric layer,
   a layer containing silver formed on the dielectric layer, and
   a protective surface layer comprising titanium oxide and at least one other metal oxide of high hardness selected from the group consisting of $ZrO_2$ and $Cr_2O_3$.
2. The glazing according to claim 1, wherein the metal oxide(s), besides the titanium oxide, of the surface layer represent at least 5% by weight of the surface layer.
3. The glazing according to claim 1, wherein the titanium oxide represents at least 40% by weight of the surface layer.
4. The glazing according to claim 1, wherein the surface layer further comprises at least one additional metal oxide, the at least one additional oxide being in a proportion not exceeding 8% by weight of all oxides of the surface layer.

5. The glazing according to claim 1, wherein, besides the titanium oxide, the surface layer comprises zirconium oxide in a proportion of from 15% to 50% by weight.

6. The glazing according to claim 1, wherein the surface layer comprising titanium oxide has a thickness not less than 3 nm.

7. The glazing according to claim 1, wherein the surface layer comprising titanium oxide has a thickness not greater than 35 nm.

8. The glazing according to claim 1, wherein the surface layer comprising titanium oxide is applied over a first protective layer of tin oxide or of silicon nitride or oxynitride optionally comprising aluminium.

9. The glazing according to claim 1, which, in a scratch resistance test performed according to standard ASTM 2486D, leads to a degree of scratching of not more than 30%.

10. The glazing according to claim 1, further comprising, besides the surface layer, at least one silver-comprising functional layer and a set of dielectric layers arranged between a glass substrate and a first silver layer, between each silver-comprising layer present, and over a last silver-comprising layer that is furthest from the glass substrate.

11. The glazing according to claim 10, comprising one, two or three silver-comprising layers each with a thickness of 7 to 20 nm.

12. The glazing according to claim 10, wherein each of the silver-comprising layers is coated with a sacrificial layer comprising an oxide or suboxide of Ti or NiCr.

13. The glazing according to claim 10, wherein the at least one silver-comprising layer is deposited on a layer comprising zinc oxide optionally doped with tin.

14. A process for preparing a glazing according to claim 1, comprising depositing the surface layer comprising titanium oxide and at least one additional oxide that improve its mechanical strength by magnetron-assisted vacuum deposition, from cathodes comprising a corresponding mixture of oxides.

15. The process according to claim 14, wherein the depositing of the surface layer is performed under a slightly oxidative atmosphere.

16. The glazing according to claim 1, wherein the layer system has a structure, starting from the glass substrate:
ZnSnO(50/50)/ZnSnO(90/10)/Ag/TiOx/ZnSnO(90/10)/
ZnSnO(50/50)/TiZrOx(55/45),
wherein the silver-comprising layer has a thickness of between 10 and 14 nm and a thickness of the TiZrOx surface layer is between 5 and 8 nm.

17. The glazing according to claim 2, wherein the metal oxide(s), besides the titanium oxide, of the surface layer represent at least 10% by weight of the whole layer.

18. The glazing according to claim 3, wherein the titanium oxide represents at least 55% by weight of the surface layer.

19. The glazing according to claim 9, which, in a scratch resistance test performed according to standard ASTM 2486D, leads to a degree of scratching of not more than 20%.

20. The glazing according to claim 1, further comprising a second dielectric layer directly underneath the surface layer, the second dielectric layer selected from the group consisting of silicon nitride, silicon oxynitride, and tin oxide.

21. An essentially transparent glazing, comprising a layer system of films deposited under vacuum by magnetron and having antisun and/or low-emission properties, said layer system comprising two silver-comprising layers, wherein the layer system has a structure, starting from the glass substrate:
ZnSnO(50/50)/ZnSnO(90/10)/Ag/TiOx/ZnSnO(90/10)/
ZnSn(50/50)/ZnSnO(90/10)/Ag/TiOx/ZnSnO(90/10)/
ZnSnO(50/50)/TiZrOx(55/45),
wherein each of the silver-comprising layers has a thickness of between 10 and 14 nm, and the TiZrOx surface layer has a thickness between 5 and 8 nm.

* * * * *